Figure 2:
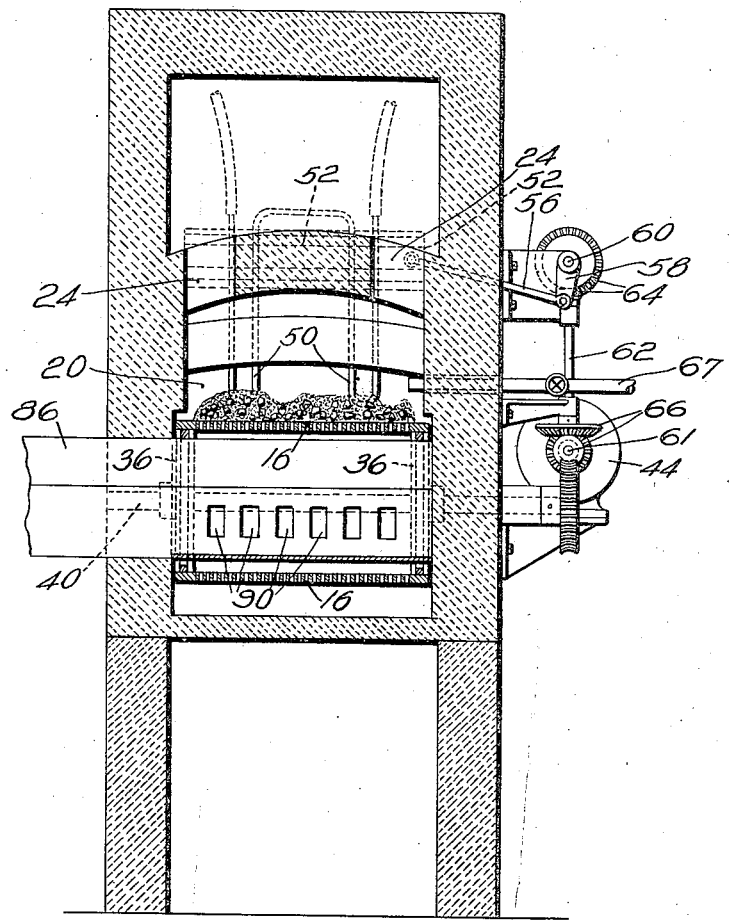

W. D. KILBOURN.
METHOD AND APPARATUS FOR SUBLIMING AND SINTERING ORES.
APPLICATION FILED NOV. 7, 1917.
1,278,166.
Patented Sept. 10, 1918.
2 SHEETS—SHEET 1.
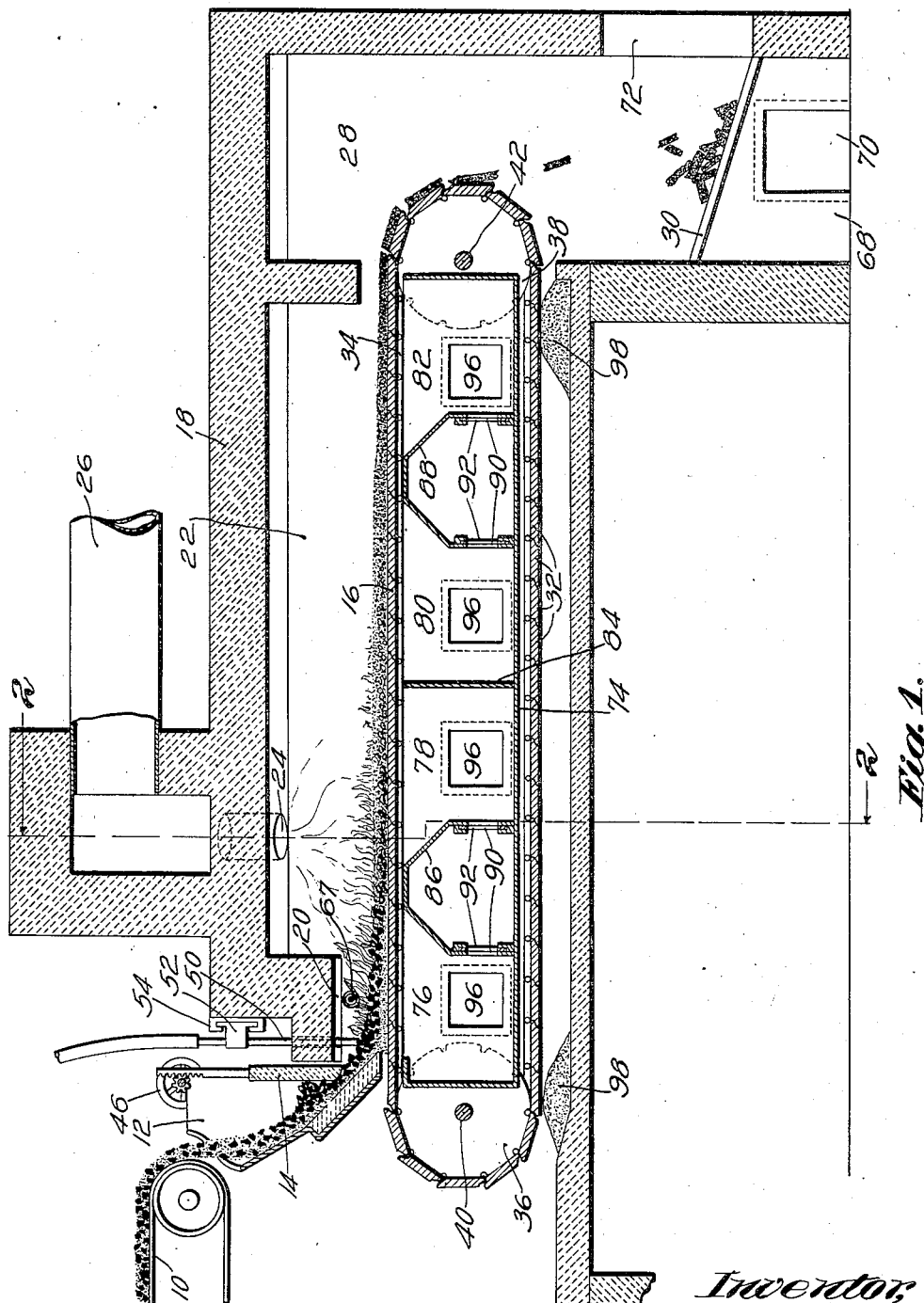

UNITED STATES PATENT OFFICE.

WILLIAM D. KILBOURN, OF PUEBLO, COLORADO, ASSIGNOR TO UNITED STATES SMELTING, REFINING & MINING COMPANY, A CORPORATION OF MAINE.

METHOD AND APPARATUS FOR SUBLIMING AND SINTERING ORES.

1,278,166.  Specification of Letters Patent.  Patented Sept. 10, 1918.

Application filed November 7, 1917. Serial No. 200,743.

*To all whom it may concern:*

Be it known that I, WILLIAM D. KILBOURN, a citizen of the United States, residing at Pueblo, in the county of Pueblo and State of Colorado, have invented certain new and useful Improvements in Methods of and Apparatus for Subliming and Sintering Ores; and I do hereby declare the following to be a full, clear, and exact description of the invention, such as will enable others skilled in the art to which it appertains to make and use the same.

This invention relates to a method of and apparatus for treating zinc retort residues and similar materials for the recovery of volatile metals such as zinc and the production of a sintered residue containing lead, silver and similar metals in a suitable condition for treatment in a blast furnace. Although the invention is particularly adapted for treating zinc retort residues it is also well adapted for treating ores having a substantial percentage of zinc or other volatile metals or ores containing zinc, silver and lead, and especially all zinc ores containing gold and copper values which are to be recovered in a subsequent smelting operation.

In the reduction of zinc ore in the well-known Belgian process furnace, crushed zinc ore is placed in a retort with coal, and the retort is closed and heated externally to burn the coal and reduce the zinc. At the end of the operation the retort is opened and a residue is removed which consists of a comparatively fine-grained material containing the non-volatile constituents of the ore, and any volatile material remaining unvolatilized and the coke formed by the combustion of the coal. The residues often contain metallic values such as lead, copper, gold and silver, in sufficient quantities to warrant the subsequent treatment of the residue in a lead smelter. The residues, however, are not suitable for charging directly into a lead furnace on account of their fine-grained condition. Further, the residue has a carbon content of from 30 to 50 per cent. which is of no value in the usual lead smelting operation, and a zinc content of from 6 to 10 per cent., which is very objectionable in the lead smelting operation. The primary object of the present invention is to provide a method and apparatus by which such zinc retort residues may be sublimed and sintered to remove the zinc and reduce the residue to a condition well suited for treatment in a smelter, and to this end the invention comprises the features and combinations hereinafter described and set forth in the claims.

Figure 3:
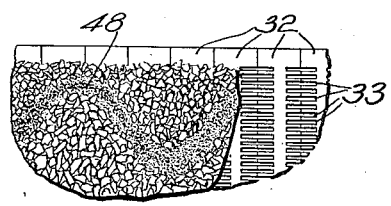

In the accompanying drawings, illustrating diagrammatically an apparatus in which the preferred method of the invention may be carried out, Figure 1 is a vertical, longitudinal section of a furnace embodying the preferred form of the invention; Fig. 2 is a section of the furnace shown in Fig. 1, taken on the line 2—2 of Fig. 1; and Fig. 3 is a detail plan view showing a section of the traveling grate having a bed of ore thereon and illustrating diagrammatically the method in which the bed of ore is furrowed.

To carry out the preferred method with the apparatus shown in the drawings the ore or material containing the volatile metals is discharged from a belt conveyer 10 into a hopper 12, which is provided with a feed door 14 for regulating the delivery of the ore on to a traveling grate 16. The grate is arranged to pass into and out of a furnace 18 to carry a bed of ore from the entrance to the discharge end of the furnace. As the bed is formed on the grate it passes under an ignition arch 20 where the combustion of the carbonaceous material in the bed is started, and combustion supporting gases are forced up through perforations in the grate to maintain the ignition. After the bed passes out from under the ignition arch it is advanced through a combustion chamber 22, and air is forced up through it throughout substantially its entire length to promote combustion and assist in the reduction and volatilization of the metals. The length of the combustion chamber and the rate of travel of the grate are so regulated that by the time the bed of ore has passed through the combustion chamber it will be sintered, and the volatile metals driven off. The volatile metals and products of combustion pass out through openings 24 in an arched roof of the combustion chamber, and enter a flue 26 by which they are conducted to a baghouse or other suitable equipment for recovery. The sintered bed is carried by the grate into a screening chamber 28 of the furnace, and discharged on a screen 30 in the form of clinkers or sintered lumps which are in excellent condition for treatment in a lead blast furnace, The grate 16 as shown is an endless chain grate and consists of a series of perforated bars 32 (Fig. 3), having perforations 33 to permit passage of combustion supporting gases into the bed of material on the grate. The bars 32 are secured at their opposite ends to link chains 34 which run between sprockets 36 and 38 mounted on shafts 40 and 42 respectively. The shaft 42 is journaled between opposite walls of the furnace 18 adjacent the junction of the combustion and screening chambers of the furnace. The shaft 40 is journaled on the front end of the furnace, and is arranged to be driven by a motor 44. The motor 44 is preferably a variable speed electric motor by which the speed of the grate may be accurately controlled to secure any desired rate of travel of the ore bed through the combustion chamber.

To facilitate the ignition, and also to insure a complete combustion of the carbonaceous materials, and the proper reduction and volatilization of the metals, the ore or other material in the bed is so classified that the coarser particles and the particles having the highest carbon content are positioned in the upper portion of the bed. In case the material to be treated is a zinc retort residue from a Wetherill furnace which contains a large proportion of fine-grained metallic particles mixed with particles of coke and particles containing a high percentage of carbon, it may be thus classified as it is fed into the hopper, as indicated in Fig. 1. As here shown the base of the hopper 12 is inclined at a comparatively sharp angle with relation to the feed door 14, and the speed of the conveyer 10 is so related to the travel of the grate that the surface of the material in the hopper is also maintained at a fairly sharp angle. The coarser particles containing carbon therefore roll down the slope and collect against the feed door, while the fine-grained heavier metallic particles lag behind and pass to the feed door opening in proximity to the base of the hopper. Under these conditions the forward travel of the grate forms a layer of charge upon the grate in which the coarser particles and those highest in carbon content are on top of the finer particles, so that they may be directly acted on by the ignition devices, and their ignition not retarded by the finer particles. The feed door 14 is arranged to be adjusted relatively to the bottom of the hopper by a hand wheel 46 to regulate the passage of the material from the hopper on to the grate. In case the residue does not contain enough coke or carbonaceous material, coal or other suitable carbonaceous material may be fed in against the door 14 so as to pass down with the material and remain in the upper portion of the bed. In the treatment of zinc ores, the ore and coal may be fed separately to the hopper 12, or the charge layer may be classified in any suitable manner.

The lower face of the ignition arch is preferably positioned a short distance above the bed, and is maintained at high temperature to start the burning of the coke and carbonaceous material in the upper portion of the bed. The proper and uniform ignition of the charge as it enters the combustion chamber is of vital importance, and is insured by forming depressions or thin places in the upper portion of the bed which are preferably in the form of furrows or channels extending lengthwise of the bed, preferably in a sinuous path, as illustrated at 48 in Fig. 3. When the air or other combustion supporting gas is forced through the grate, it first penetrates the charge layer in the thinner places, or in and along the furrows or channels. The blow pipe action through the furrows causes intense heat to play upon the ignition arch, so that it is brought to and kept at a high temperature, while the ignition along the furrow travels rapidly, thus rendering it unlikely that the fire will be carried out from under the arch, with a resulting cooling of the arch and interruption of the operation. The release of the air through the depressions or furrows causes the thicker parts of the bed to act as a check for the air, thus securing the blow pipe action with the resulting intense heat which is radiated from the arch and rapidly ignites the portions of the charge not adjacent to the furrows. Thus the ignition is made certain and continuous.

In the construction shown the furrows are made by means of water cooled bars or pipes 50 which project down through openings in the ignition arch and have their lower ends spaced a short distance above the grate. The bars may remain stationary to make straight furrows in the bed, but it is preferred to so form the furrows that they will extend across the major portion of the bed, since with this arrangement the ignition of the arch across its entire width will be insured. To thus form the furrows the bars are so mounted that they may be reciprocated as the bed travels under them. As shown they are secured to a slide 52 which is mounted in a guide 54, and is connected by a pitman 56 with a crank 58 carried on a shaft 60. The shaft is driven through a vertical shaft 62 connected therewith, and with the driving shaft 61 of the motor 44 by bevel gears 64 and 66.

To bring the temperature of the ignition arch to a high temperature for starting the furnace or to assist in maintaining a high temperature of the arch, an oil or gas burner 67 is mounted in the furnace wall immediately below the ignition arch. When starting the furnace the bed of material is held stationary under the ignition arch until the burner 67 has heated the arch and ignited the bed. Then the grate will be set in motion and the burner 67 turned off.

As the bed is advanced through the combustion chamber 22 by movement of the grate, the coarser particles, which are mostly coke, settle to the bottom of the bed, because the action of the air or combustion gases through the grate tends to bring the finer materials in the lower portion of the bed up to the upper portion of the bed. By the time the bed has advanced past the ignition arch, the material in the furrows begins to sinter, thus retarding the passage of the combustion supporting gas in the furrows, so that the passage of the air or gas through the bed will be practically uniform after it has advanced a short distance from the ignition arch. The pressure of the air or gas through the grate is maintained throughout the length of the combustion chamber to burn the carbon content and sublime the volatile metals. The burning of the material causes the bed to contract, and the intense heat forms a comparatively solid clinker or sintered mass.

When the grate enters the screening chamber 28 it is carried around the sprockets 38 to reverse its direction from the carrying course to the return course. While going over the sprocket the grate bars are separated and move relatively to one another, which acts to break up the sintered mass, and permits it to fall on to the screen 30. A certain proportion of the mass discharged from the grate will be fine, and will pass through the screen 30. This fine material is collected in a chamber 68 and may be removed through a door 70. In case the volume of fine material is comparatively large, it may be collected in a car which would be located in the chamber 68 under the screen 30. The sintered material which remains on the grate 30 may be periodically removed through a door 72 in the rear end of the furnace, and discharged directly into cars by which it may be conveyed to a blast furnace. The fine material caught in the chamber 68 usually carries metallic values of copper, gold, and lead, and is returned to the conveyer belt 10 to be formed into a sintered mass.

To accurately control the passage of air or combustion supporting gases through the grate 16, the air or gas is admitted under the grate through an air box 74 which extends between the opposite walls of the furnace 18, and is positioned between the carrying and return courses of the grate. The air box is divided into four sections, 76, 78, 80 and 82, by means of a partition 84, and twyer boxes 86 and 88. The twyer boxes project through the side wall of the left-hand side of the furnace (Fig. 2), and are arranged to be connected with air pressure mains. To control the air pressure in each of the sections 76, 78, 80 and 82, a series of openings 90 is formed in the opposite sides of the twyer boxes, the size of which openings is arranged to be regulated by means of slide plates 92. During the passage of the bed through the furnace on the grate some of the fine material of the bed works its way through the openings 33 in the grate and accumulates in the air box 74. In order to recover this material, cleaning doors 96 are located in the sides of each of the sections 76, 78, 80 and 82. The lower run of the grate may travel in contact with sand seals indicated at 98.

When the percentage of zinc or other volatile metals is comparatively high in the zinc retort residues, any desired reducing agent may be added to the charge as it is formed into a body upon the grate. It is to be understood that in the reduction of ores containing volatile metals the proper reducing agents or fluxes will be placed in the charge which is formed into a bed upon the grate.

The preferred form of the invention having been thus described, what is claimed as new is:—

1. The method of continuously subliming and sintering ores or like material containing volatile metals comprising forming a substantially continuous traveling bed with particles high in carbon content in the upper portion thereof, progressively igniting the bed and passing a blast of combustion supporting gas up through the bed to maintain the combustion as it advances and thereby drive off the volatile metals and cause the concentrated mass to sinter.

2. The method of continuously subliming and sintering ores or like material containing volatile metals comprising forming a substantially continuous traveling bed with depressions therein, passing the bed under a heat reflecting surface, and forcing a blast of air through the bed under the surface to progressively ignite the bed.

3. The method of subliming ores or like material containing volatile metals comprising forming a bed of material with particles high in carbon content in the upper portion of the bed, advancing the bed under a heat reflecting surface, forming depressions in the bed prior to its passage under said surface, and forcing a combustion sustaining gas through the bed under said surface and during its continued travel.

4. The method of subliming ores or like material containing volatile metals comprising forming a traveling body of material with coarser particles and particles having high carbon content in the upper portion of the bed, progressively igniting the bed, advancing the bed through a combustion chamber, and forcing an air blast up through the advancing bed with sufficient pressure to carry the finer particles to the upper portion of the bed and work the fuel particles toward the lower portion of the bed.

5. The method of subliming ores or like material containing volatile metals comprising forming a bed of material with coarser particles and particles high in carbon content in the upper portion of the bed, advancing the bed in close proximity to a heat reflecting ignition surface, continuing the advance of the bed through a combustion chamber, forcing an air blast up through the advancing bed below the ignition surface to progressively ignite the bed and during its travel through the combustion chamber to maintain the combustion of its fuel contents.

6. The method of subliming and sintering zinc retort residues comprising forming a substantially continuous traveling bed of the residue with the particles highest in carbon content in its upper portion, progressively igniting the top of the bed as it advances, and also passing an air blast up through it during its continued travel to sustain the combustion of its fuel contents until the zinc is volatilized and the concentrated mass is sintered.

7. A subliming and sintering furnace, having, in combination, a combustion chamber, a traveling grate movable through said chamber, an ignition arch at the entrance of said chamber, and means to form a bed of ore or similar material containing volatile metals on the grate before it passes under the arch, and means for passing an air blast through the grate below the arch and during its travel through the combustion chamber.

8. A subliming and sintering furnace, having, in combination, a combustion chamber, a traveling grate movable through said chamber, an ignition arch above said grate, means to deposit ore or similar material containing volatile metals on said grate, a starting burner between the arch and grate, and means for passing a blast of air through the grate below the arch.

9. A subliming and sintering furnace, having, in combination, a combustion chamber, a traveling grate for carrying a bed of ore or similar material containing volatile metals through the chamber, means for forming depressions in said bed as it advances into said chamber, and means for passing an air blast up through the bed.

10. A subliming and sintering furnace, having, in combination, a combustion chamber, a traveling grate for carrying a bed of ore or similar material containing volatile metals through the chamber, an ignition arch under which the grate travels, means for forming depressions in said bed below the arch, and means for forcing an air blast through the bed below the arch and during its travel through the chamber.

11. A subliming and sintering furnace, having, in combination, a combustion chamber, a traveling grate moving through said chamber, an ignition arch at the entrance of the chamber, means for forming a bed of ore or similar material containing a volatile metal on the grate before it passes under the arch, an air box under the grate divided into a series of sections, means for forcing air through said sections and up through the grate, and means for controlling the air entering each of the said sections.

12. A subliming and sintering furnace, having, in combination, a combustion chamber, a traveling grate for carrying a bed of ore or like material containing volatile metals through said chamber, bars arranged to project into the bed to form furrows therein, and means for passing an air blast through the bed.

13. A subliming and sintering furnace, having, in combination, a combustion chamber, a traveling grate, means to form a bed of ore or like material containing volatile metal on said grate as it advances through said chamber, bars arranged to project into said bed, means for moving the bars transversely of the furnace, and means for passing an air blast through the bed.

14. A subliming and sintering furnace, having, in combination, a combustion chamber, an endless traveling grate movable through the chamber, a hopper for forming a bed on the grate, an ignition arch above the grate between the hopper and the entrance of the combustion chamber, and means for passing a blast of air up through the grate below the ignition arch and during its travel through the combustion chamber.

15. A subliming and sintering furnace, having, in combination, a combustion chamber, a traveling grate movable through the chamber, means for forming a charge bed on the grate, an ignition arch, means for forming depressions in the bed prior to its passage under the arch, and means for passing a blast of air up through the grate below the arch and during its travel through the combustion chamber.

WILLIAM D. KILBOURN.